INVENTOR.
BY Harold E. Schultze
His Attorney

United States Patent Office

3,090,611
Patented May 21, 1963

3,090,611
ANTI-ROLL CONTROL SYSTEM
Harold E. Schultze, Dayton, Ohio, assignor to General Motors Corporation, Detroit, Mich., a corporation of Delaware
Filed Oct. 28, 1960, Ser. No. 65,742
4 Claims. (Cl. 267—11)

This invention relates to a stabilizer and to a control system for a motor vehicle that is adapted to counteract transverse roll of the sprung assembly of the vehicle relative to the unsprung assembly when the vehicle is caused to deviate from a straight line course of movement.

The roll control system of this invention employs a pair of hydraulic cylinder and piston assemblies that are positioned between the sprung assembly and the unsprung assembly of the vehicle adjacent transversely axially spaced ground engaging wheels of the vehicle. The hydraulic cylinders are cross connected in such a manner that one end of one of the cylinders is connected with the opposite end of the second cylinder and the corresponding one end of the second cylinder is connected with the opposite end of the first cylinder with the result that piston movement in either of the cylinders toward the respective one end of the respective cylinders results in displacement of hydraulic fluid from the said one end of the respective cylinder to the opposite end of the other cylinder whereby collapsing movement of one of the piston and cylinder assemblies tends to prevent extension movement of the other piston and cylinder assembly to retain the vehicle in a more level condition. Because of differential displacement in the respective hydraulic cylinders, a pressure accumulator is connected with each of the cross connecting conduit lines between the hydraulic cylinders so that displacement of hydraulic fluid from either of the cylinders will first work against the pressure accumulator connected with the respective cross connecting line to establish a minimum predetermined fluid pressure that is applied to the respective opposite ends of the cylinders. Also, the respective cylinders are provided with valve means which is adapted to permit exhaust of hydraulic fluid from the respective one end of the cylinders into the fluid reservoir when the pressure in either of the cross connecting conduits exceeds a predetermined pressure value above a set minimum pressure that is effective from either of the pressure accumulators.

Further objects and advantages of the present invention will be apparent from the following description, reference being had to the accompanying drawings, wherein a preferred embodiment of the present invention is clearly shown.

Figures 1, 2:
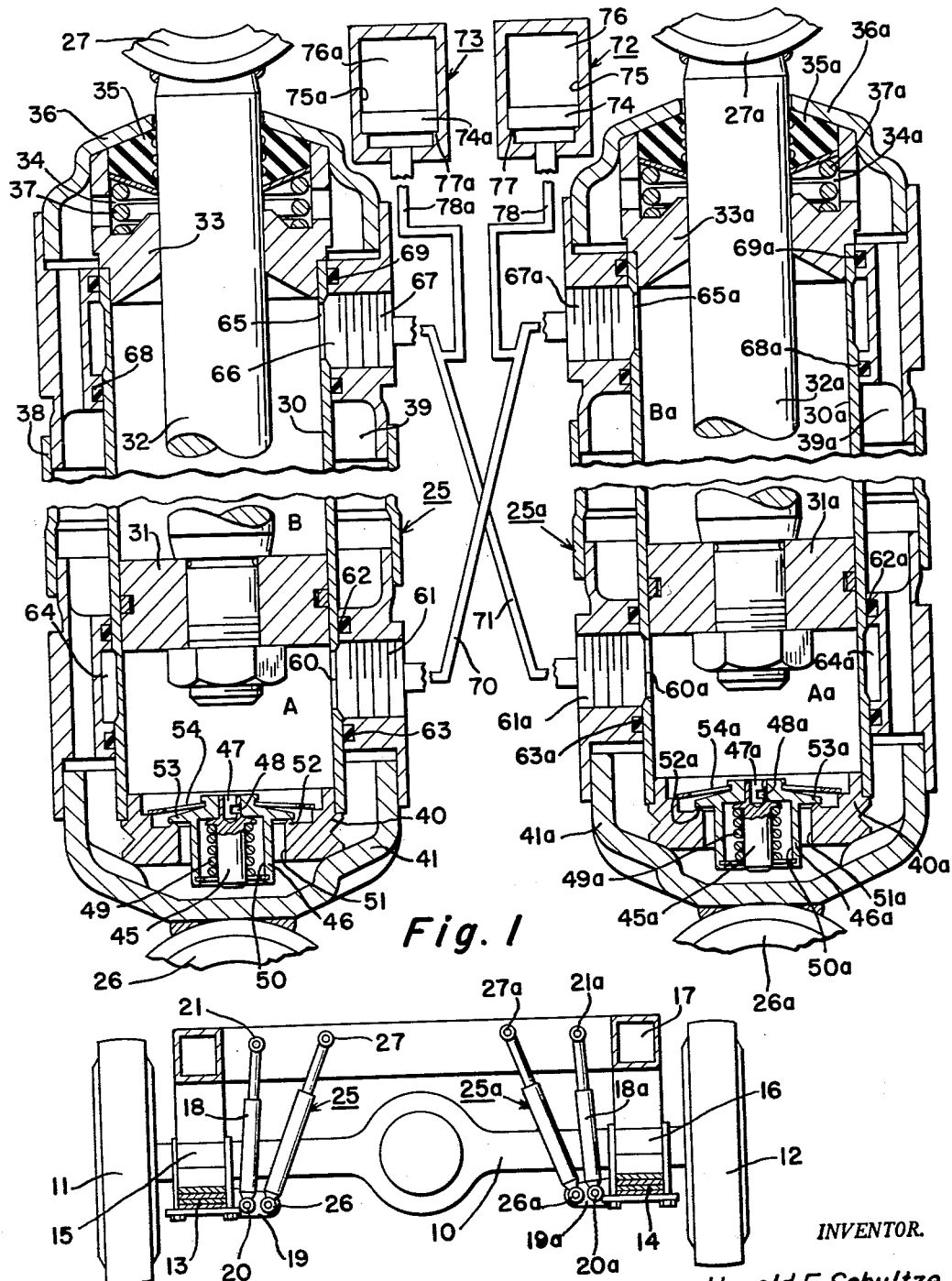
FIGURE 1 is a schematic view of an anti-roll system incorporating features of this invention and illustrating the hydraulic piston and cylinder assemblies in cross section.
FIGURE 2 is a schematic view illustrating the location of the anti-roll cylinders on a vehicle.

The anti-roll cylinders and the control system incorporating the same are adapted to be mounted on a vehicle that includes an axle housing 10 having transversely axially spaced ground engaging wheels 11 and 12 supported on an axle contained within the axle housing 10. Conventional leaf type springs 13 and 14 positioned adjacent each of the wheels 11 and 12 are carried on the axle housing 10 by conventional saddle mounts 15 and 16. The leaf springs 13 and 14 resiliently support a chassis or frame 17 which in turn supports the body of the vehicle. Thus the unsprung assembly consisting of the axle housing and wheels supports the sprung assembly comprising the frame and body by way of the springs 13 and 14. A conventional direct acting tubular type shock absorber 18 is connected between a mounting arm 19 at the spring 13 and the frame 17 by means of the mounting elements 20 and 21 of the shock absorber. A similar shock absorber 18a is connected between the mounting arm 19a and the frame 17 by means of the mounting elements 20a and 21a.

A hydraulic stabilizing cylinder 25 is connected between the sprung assembly and the unsprung assembly adjacent the spring 13, suitable mounting elements 26 and 27 providing for attachment of opposite ends of the stabilizing cylinder to the mounting arm 19 and to the frame 17. Similarly a stabilizing cylinder 25a is mounted between the arm 19a and the frame 17 by means of the mounting elements 26a and 27a. The stabilizing cylinders 25 and 25a are more specifically illustrated in FIGURE 1 in longitudinal cross section.

The stabilizing cylinders 25 and 25a illustrated in FIGURE 1 are of identical construction except that they are arranged as left and right-hand units as shown on the drawing for cross connection between opposite ends of the cylinders. Since both of the hydraulic cylinders or stabilizers are of identical construction, a detail description will be given of only one of them and corresponding reference numerals will be applied to the other of the stabilizing cylinders with the suffix "a" being added to the reference numerals.

The stabilizing device 25 consists of a pressure cylinder 30 reciprocably receiving a solid headed piston 31 carried on the end of a rod 32 that extends through a rod guide 33 which closes one end of the pressure cylinder 30. The rod guide 33 has a rod seal chamber 34 containing a rod seal member 35 retained in the chamber 34 by a cap member 36, a compression spring 37 applying pressure to the rod seal 35 to seal the same against the surface of the rod 32.

The cap 36 is secured to a reservoir tube 38 surrounding the pressure cylinder 30 in spaced relationship thereto thereby forming the reservoir space 39.

The opposite end of the pressure cylinder 30 is closed by a valved closure member 40 that is supported on a cap member 41 closing the opposite end of the reservoir tube 38.

The valved closure member 40 consists of a first valve member 45 in the form of a reciprocating plug retained in a second valve member 46. The plug valve 45 has an axial bore 47 and a transverse slot 48 by which hydraulic fluid under pressure will discharge from the cylinder chamber A when the plug valve 45 is moved downwardly against the force effect of the compression spring 49.

The plug valve 45 is contained in a recess 50 provided in the second valve member 46. The second valve member 46 is located in an axial bore 51 in the valved closure member 40, an annular seat 52 being provided around the periphery of the bore 51 on which the flange element 53 of the valve member 46 seats as retained by a light finger spring 54.

On movement of the piston member 31 toward the closure member 40, hydraulic fluid under pressure moves valve 45 downwardly so that hydraulic fluid can be displaced into the reservoir chamber 39. On movement of the piston 31 away from the closure member 40, hydraulic fluid will move from the reservoir chamber 39 through the bore 51 into the chamber A by lifting valve 46 from its seat 52 against the action of the light finger spring 54.

The pressure cylinder 30 has a port 60 adjacent the valved closure member 40 that communicates with a first port 61 providing for displacement of hydraulic fluid from chamber A. O-ring seals 62 and 63 prevent high pressure leakage from the annulus chamber 64 with which the port 61 connects.

At the opposite end of the pressure cylinder 30 there is provided a port 65 adjacent the rod guide 33 that connects with an annulus chamber 66 that connects with the second port 67. O-rings 68 and 69 prevent leakage of hydraulic fluid from the annulus chamber 66.

A first conduit member 70 extends from the first port 61 of the hydraulic stabilizer 25 into connection with the port 67a of the hydraulic stabilizer 25a, the the port 67a being comparable to the port 67 of the stabilizing device 25. A second conduit 71 extends from the first port 61a of the hydraulic stabilizer 25a into communication with the port 67 of the hydraulic stabilizer 25, the conduits 70 and 71 thereby cross connecting the stabilizers 25 and 25a.

The first and second conduits 70 and 71, respectively, have accumulators 72 and 73 which can be identified as first and second accumulators associated with the first and second conduit means 70 and 71, respectively. Thus accumulator 72 is connected with conduit 70 and accumulator 73 is connected with conduit 71.

Each of the accumulators 72 and 73 are identical in construction and consist of a piston 74 reciprocable in a cylinder 75, the chamber 76 above the piston 74 being filled with a gaseous pressure of a suitable pressure value. The cylinder 75 has a shoulder 77 against which the piston 74 seats when pressure is depleted in the conduit 70. At this time, the force effect of the gaseous pressure in the chamber 76 will not be effective on the hydraulic fluid in the conduit 70 since the piston 74 of the accumulator is resting on the shoulder 77.

Similarly, accumulator 73 consists of a piston 74a reciprocable in a cylinder 75a with a gas pressure chamber 76a being provided above the piston 74a. The piston 74a rests against the shoulder 77a so that when the accumulator is in the position shown in the drawing, the force effect of the gaseous pressure in chamber 76a will not be effective on the hydraulic fluid in the conduit 71. Conduit 78 connects the accumulator 72 with conduit 70 and conduit 78a connects accumulator 73 with conduit 71.

With the vehicle incorporating the system shown in FIGURE 1 in static condition, hydraulic fluid pressure in chambers A and B of the stabilizing device 25 as well as the hydraulic pressure in chambers Aa and Ba of the stabilizing device 25a will be of zero value because the pistons 74 and 74a of the accumulators 72 and 73 are engaging the shoulders 77 and 77a, respectively, of the accumulators so as to prevent the force effect of gaseous pressure of the accumulator being applied to the hydraulic fluid in the conduits 70 and 71.

However, when the vehicle is moving over the road and, for example, a right turn is negotiated, the stabilizing device 25 will tend to collapse to move piston 31 toward the valved closure member 40 while stabilizing device 25a tends to extend with piston 31a moving away from the valved closure member 40a. As piston 31 moves toward closure member 40 of stabilizing device 25, hydraulic fluid is displaced from chamber A into the conduit 70 and thence into chamber Ba of the stabilizing device 25a. From the drawings it will be apparent that the displacement volume from chamber A into chamber Ba is substantially greater than can be received by chamber Ba by the volume of the rod 32a that is contained in chamber Ba. Thus, as soon as piston 31 of stabilizing device 25 moves toward the valved closure member 40, this differential of displacement between the two chambers A and Ba causes the excess hydraulic fluid to be applied to the lower side of the piston 74 in accumulator 72 and urge the piston 74 against the force effect of the gaseous pressure in the chamber 76. This results in pressurization of the hydraulic fluid in the chambers A and Ba of the respective stabilizing devices 25 and 25a at least equal to the minimum value of accumulator pressure developed as the piston 74 is initially lifted from the shoulder 77 by the hydraulic fluid being displaced from chamber A to chamber Ba.

This accumulator pressure applied to the hydraulic fluid results in a hydraulic fluid pressure in chamber Ba that is applied to the upper side of the piston 31a of stabilizing device 25a to resist extension movement of the rod 32a relative to the pressure cylinder 30a. This downward force on the piston 31a tends to prevent the right-hand side of the vehicle from rising as the vehicle negotiates a right-hand turn, the body of the vehicle normally tending to tilt toward the outside of the curve.

Pressure will rise in chambers A and Ba of the respective stabilizing devices 25 and 25a as the hydraulic fluid is displaced from chamber A against the action of the accumulator piston 74 tending to move it upwardly into the gas chamber 76, gradually further compressing the gas pressure in the chamber 76 to increase force effect thereof on the piston 74 and thereby increase the hydraulic force effect of the fluid in chambers A and Ba. However, when this pressure reaches a predetermined value sufficient to overcome spring 49 of valve 45 in the valved closure member 40 of the stabilizing device 25, valve member 45 will move downwardly against the spring 49 and allow excess hydraulic fluid to be displaced through the axial port 47 and the transverse port 48 and thence upwardly into the reservoir chamber 39. This action thereby maintains control over the maximum hydraulic pressure that will be applied in the chamber Ba to resist extension movement of the piston 31a of stabilizing device 25a.

When a curve has been negotiated and the vehicle approaches a straight line course, the body of the vehicle will tend to return to a level condition relative to the road so that piston 31 will now move upwardly away from the closure member 40 and piston 31a of stabilizing device 25a will move toward the closure member 40a.

As piston 31a of stabilizing device 25a is moving upwardly from the valved closure member 40a on the aforesaid extension movement of the stabilizing device, it will be apparent that the downward movement of piston 31 together with the upward movement of piston 31a will require additional hydraulic fluid to be supplied into the chamber Aa of stabilizing device 25a and into chamber B of stabilizing device 25a. Since the piston 74a of the accumulator 73 is resting on shoulder 77a, there is no force effect of the gaseous pressure in chamber 76 on any hydraulic fluid in conduit 71. Under this circumstance the valve member 46a opens upwardly against the light finger spring 54a to provide substantially free flow of hydraulic fluid from reservoir chamber 39a into chamber Aa of stabilizing device 25a and into chamber B of stabilizing device 25 to maintain these chambers filled with hydraulic fluid.

After the vehicle has negotiated the curve and the body of the vehicle is returning to a level condition relative to the road, upward movement of piston 31 of stabilizing device 25 will quickly utilize the volume of fluid that has been displaced into accumulator 72 below piston 74 to refill the chamber A of stabilizing device 25 and the chamber Ba of stabilizing device 25a to again allow the piston 74 to engage the shoulder 77. At this time the force effect of the gas pressure in chamber 76 is removed from the hydraulic fluid in the conduit 70. As soon as the force effect of the gas pressure in the accumulator 72 is removed from the hydraulic fluid in conduit 70, and hydraulic fluid pressure in chambers A and Ba of the respective stabilizing devices returns to a zero value, valve 46 in the closure member 40 of stabilizing device 25 will open upwardly against the light finger spring 54 to provide for substantially free flow of hydraulic fluid from reservoir chamber 39 into chamber A to refill the same and to supply any hydraulic fluid needed to fill chamber Ba of stabilizing device 25a.

It will be apparent that in returning to the level condition, downward movement of piston 31a of stabilizing device 25a will produce displacement of hydraulic fluid from chamber Aa of stabilizing device 25a for delivery into conduit 71 and into chamber B of stabilizing device 25 and thereby work against the bottom face of piston 74a in the accumulator 73 to produce a force effect in chamber B tending to retard the movement of piston 31 away from closure member 40. This prevents a sudden return of the body of the vehicle to a level condition.

While the embodiment of the invention as herein disclosed constitutes a preferred form, it is to be understood that other forms might be adopted.

What is claimed is as follows:

1. A control system on a vehicle having a frame and an axle which constitute sprung and unsprung assemblies, respectively, said system being adapted to counteract transverse roll of the sprung assembly relative to the unsprung assembly, including in combination, a pair of spaced apart cylinders and connected to one of said assemblies, a solid piston reciprocable in each cylinder and including an actuating rod extending from the cylinder and connected to the other of said assemblies, first conduit means connecting one end of one cylinder with the opposite end of the second cylinder, second conduit means connecting the corresponding one end of the second cylinder with the corresponding opposite end of the first cylinder, first and second pressure accumulators in connection with said first and second conduit means respectively, hydraulic fluid reservoir means for said cylinders, first valve means in the corresponding one end of each of said cylinders providing for exhaust of fluid from the respective corersponding one end to the reservoir means on hydraulic fluid pressure increase therein in predetermined pressure value above the minimum pressure value of the respective pressure accumulator in connection with the respective said one end undergoing a fluid pressure increase therein, and second valve means in said corresponding one end of each of said cylinders under the fluid pressure influence of the pressure accumulator in connection therewith providing substantially for free flow of hydraulic fluid from the reservoir means to the respective one end.

2. A control system on a vehicle having a frame and an axle which constitute sprung and unsprung assemblies, respectively, said system being adapted to counteract transverse roll of the sprung assembly relative to the unsprung assembly, including in combination, a pair of spaced apart cylinders and connected to one of said assemblies, a solid piston reciprocable in each cylinder and including an actuating rod extending from the cylinder and connected to the other of said assemblies, first conduit means connecting one end of one cylinder with the opposite end of the second cylinder, second conduit means connecting the corresponding one end of the second cylinder with the coresponding opposite end of the first cylinder, first and second pressure accumulators in connection with said first and second conduit means, respectively, said accumulators each having one operating condition in which the pressure effect of the accumulator is effective on the hydraulic fluid in the respective cylinders and a second operating condition in which the pressure effect is not effective on the hydraulic fluid, hydraulic fluid reservoir means for said cylinders, first valve means in the corresponding one end of each of said cylinders providing for exhaust of fluid from the respective corresponding one end to the reservoir means on hydraulic fluid pressure increase therein a predetermined pressure value above the minimum pressure value of the respective pressure accumulator in connection with the respective said one end undergoing a fluid pressure increase therein, and second valve means in said corresponding one end of each of said cylinders under the fluid pressure influence of the pressure accumulator in connection therewith providing substantially for free flow of hydraulic fluid from the reservoir means to the respective one end when the respective accumulator connected therewith is in its second operating condition.

3. A control system constructed and arranged in accordance with claim 2 wherein said second operating condition of the accumulators results in substantially no fluid pressure being applied to the hydraulic fluid in the cylinder connected with the respective accumulator.

4. A control system constructed and arranged in accordance with claim 2 wherein said second operating condition of the accumulators results in substantially no pressure effect on the hydraulic fluid in the cylinder connected with the respective accumulator and wherein development of hydraulic fluid pressure in the respective one end of the cylinders activates the respective accumulator connected with the respective cylinder to establish thereby accumulator pressure in the said one end of the respective cylinder and the respective opposite end of the cylinder connected with the said one end.

References Cited in the file of this patent

UNITED STATES PATENTS 2,695,079     Brundrett _____ Nov. 23, 1954

FOREIGN PATENTS 1,116,875     France _____ Feb. 13, 1956
1,173,715     France _____ Oct. 27, 1958
  330,946     Italy _____ Oct. 26, 1935